Aug. 3, 1965
L. S. LONGENECKER
3,198,354
ROTARY SCRAP CHARGING
Filed Sept. 30, 1963
6 Sheets-Sheet 1
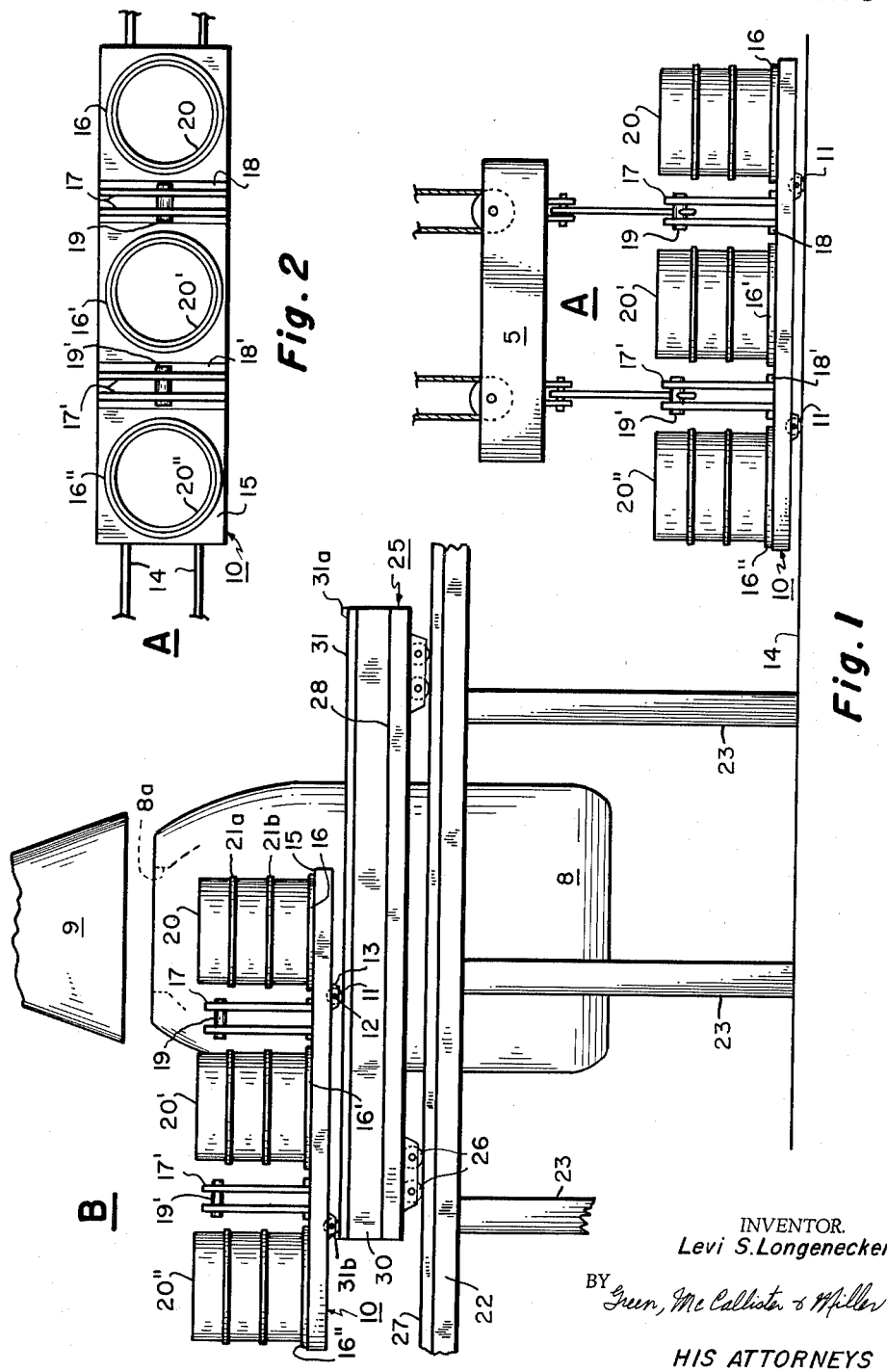
INVENTOR.
Levi S. Longenecker
BY Green, McCallister & Miller
HIS ATTORNEYS

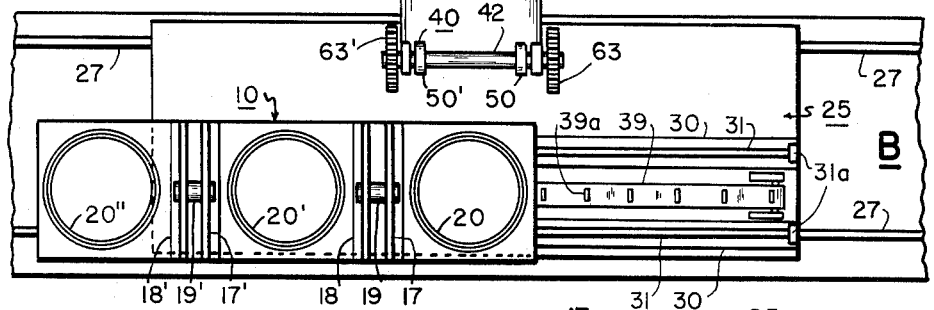
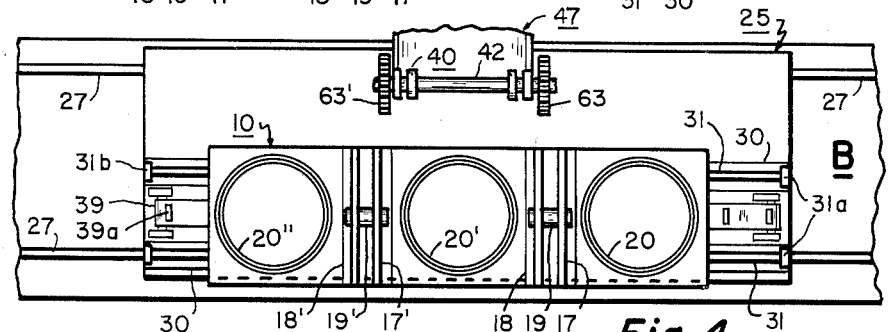
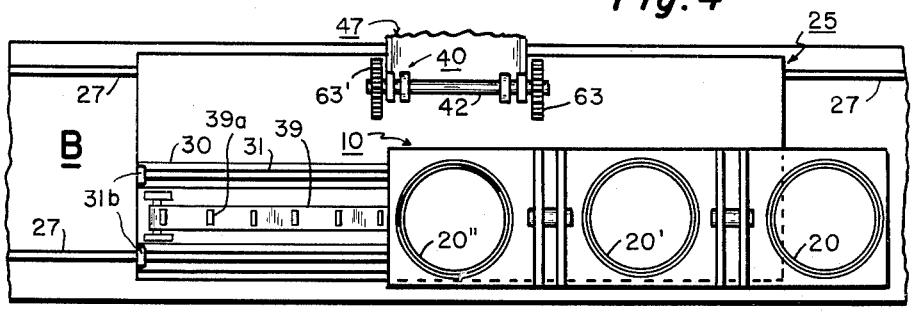
Fig. 3
Fig. 4
Fig. 5
INVENTOR.
Levi S. Longenecker

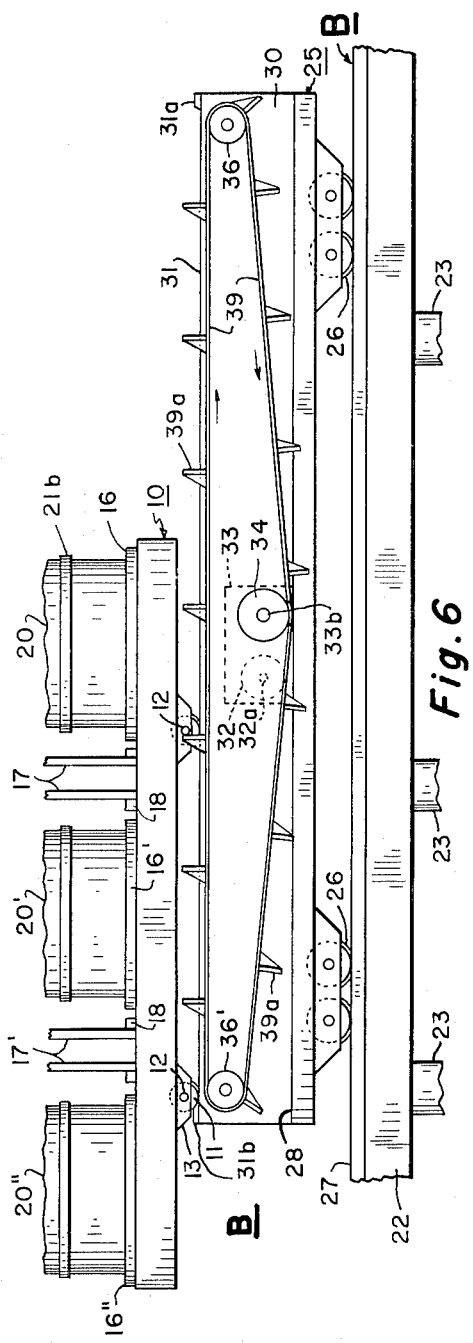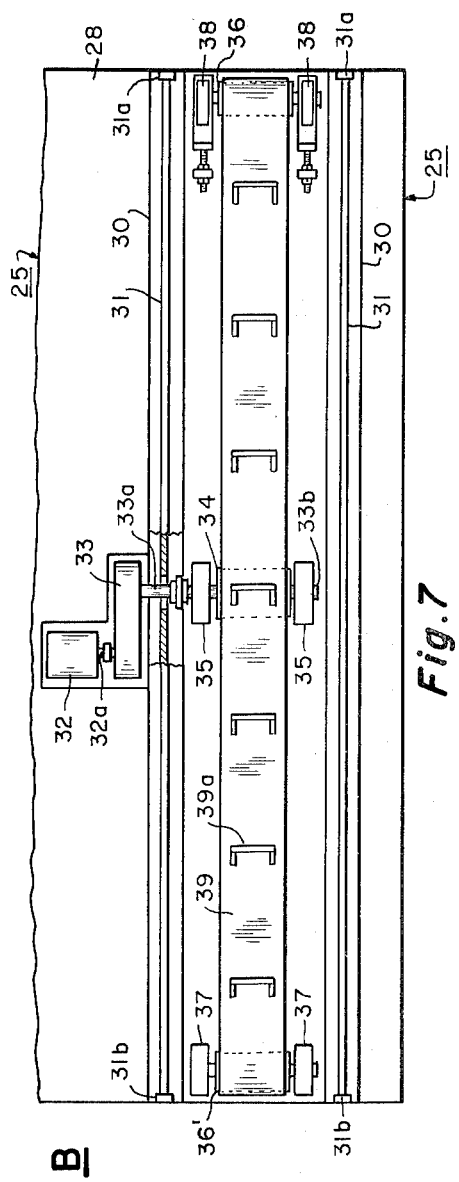

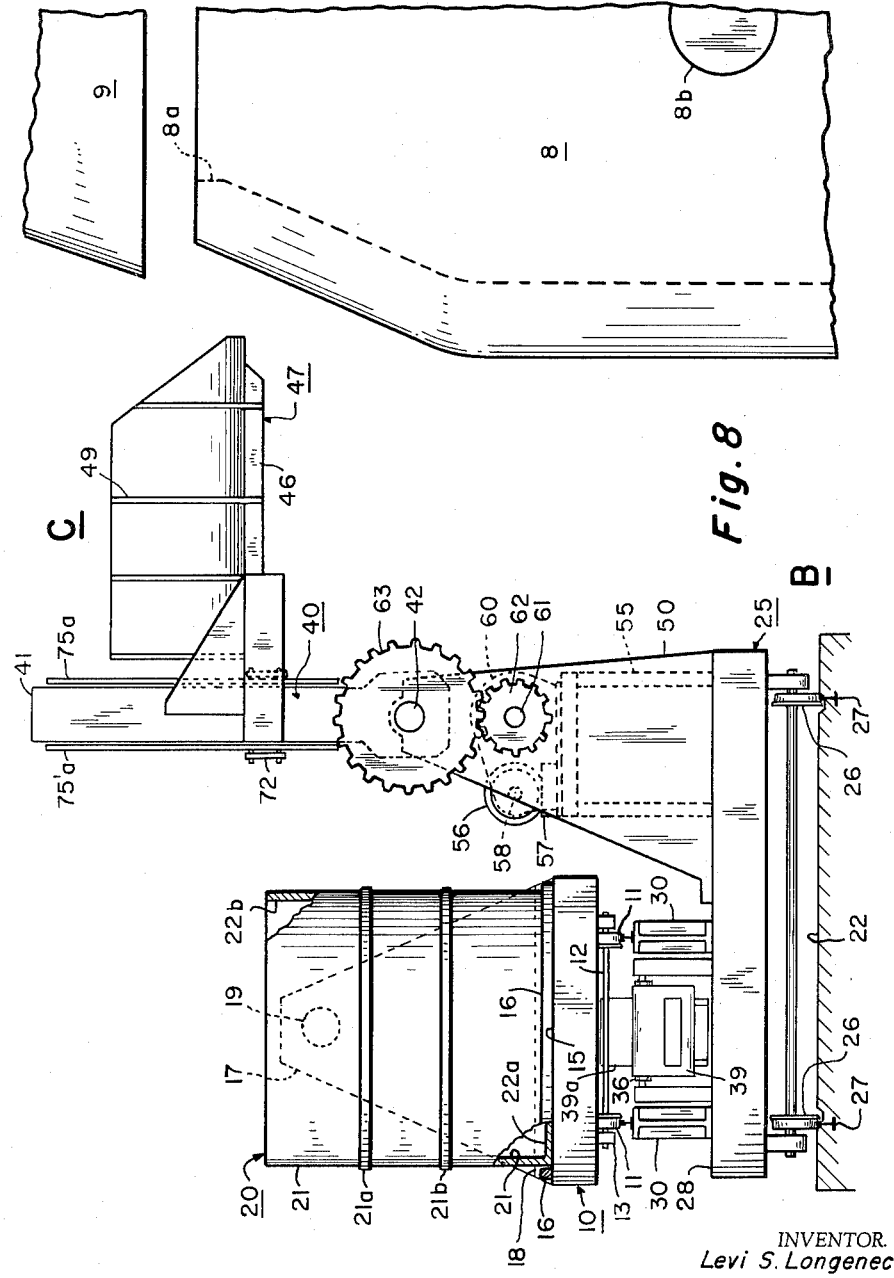

INVENTOR.
Levi S. Longenecker

INVENTOR.
Levi S. Longenecker

HIS ATTORNEYS

United States Patent Office 3,198,354
Patented Aug. 3, 1965

3,198,354
ROTARY SCRAP CHARGING
Levi S. Longenecker, 61 Mayfair Drive, Pittsburgh, Pa.
Filed Sept. 30, 1963, Ser. No. 312,617
16 Claims. (Cl. 214—18)

This application is a continuation-in-part of my co-pending application No. 226,920 of Sept. 28, 1962, entitled "Open Hearth Utilization," as to the charging means therein disclosed.

This invention relates to the charging of furnace vessels and particularly, to apparatus and procedure for charging an open mouth vessel, such as a basic oxygen blow furnace of the LD type.

A phase of my invention deals with charging apparatus having rotatable means for delivering charging material, such as solid material or scrap metal, from open mouth containers or cans and which will enable the complete charging of a particular furnace vessel, as with scrap material, through the agency of group-handled containers.

In recent years, the trend has been towards the use of so-called oxygen blow furnace vessels in the melting and refining of steel. Such furnaces make use of scrap material as a portion of the charge which may amount to approximately 45%. The capacity of furnaces of this type has been increasing from time to time, and, in this connection, there has thus been a problem in efficiently and effectively charging a particular furnace in a minimum amount of time without damage to the vessel and in such a manner as to simplify shop requirements as to charging equipment and as to minimize the operating area required for the charging.

It has thus been an object of my invention to devise charging apparatus and procedure which will meet the problem and will be flexible in its utilization.

Another object has been to devise improved apparatus and procedure for receiving, carrying, handling and feeding materials required for charging metal melting and refining furnaces having open upper portions through which the materials may be introduced.

Another object has been to devise charging apparatus which may be filled at a material or scrap collecting area, moved to and maintained in a filled ready position in a charging area on a plant floor or at a lower plant level, which may then be lifted to an upper plant level within the charging area by utilizing conventional plant equipment, such as a ladle crane, and which at the upper charging plant level, may be employed to rotatably and efficiently charge a furnace through its open mouth and in a minimized time period.

A further object of my invention has been to provide and effectively employ a multi-unit charging apparatus so as to make available sufficient material for the complete scrap charging requirements of a particular furnace.

A still further object of my invention has been to provide improved apparatus and procedure for unloading upright can-like containers in a rotating manner at an upper plant level as well as selectively with respect to furnace vessels.

These and other objects of my invention will appear to those skilled in the art from the illustrated embodiment, the description thereof, and the claims.

In the drawings:

FIGURE 1 is a longitudinal side view in elevation of a plant layout employing my invention and which utilizes apparatus and procedure thereof. It shows a support buggy with cans or containers thereon positioned on a lower plant level position A and also shows a buggy with containers thereon as moved into a cooperating position on a charging machine at an upper plant level position B;

FIGURE 2 is a top plan view of the support buggy at position A of FIGURE 1;

FIGURES 3, 4 and 5 are plan views of the apparatus of FIGURE 1 on the same scale as such figure, showing apparatus at the upper level position B and illustrating step by step procedure in selectively charging a furnace by means of a group of charging cans or containers that are carried in an upright position on the support buggy;

FIGURE 6 is an enlarged side view in elevation from the standpoint of upper level positioning B and taken longitudinally from the inside of the charging machine to illustrate means for selectively aligning charging cans or containers on the buggy with the open mouth of a furnace vessel;

FIGURE 7 is a plan view on the scale of FIGURE 6, particularly illustrating actuating mechanism of such figure, with the support buggy removed;

Figure 9:
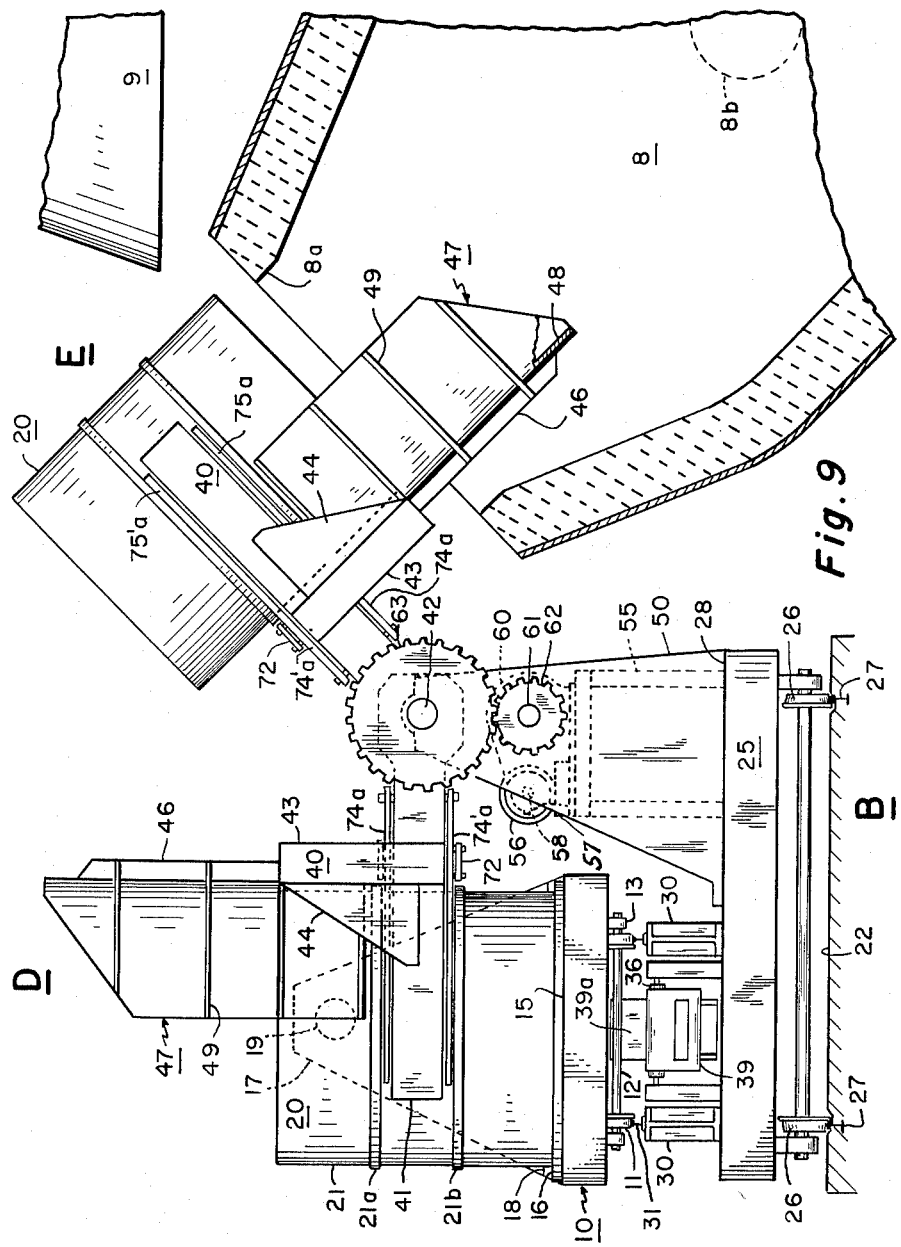
Figure 10:
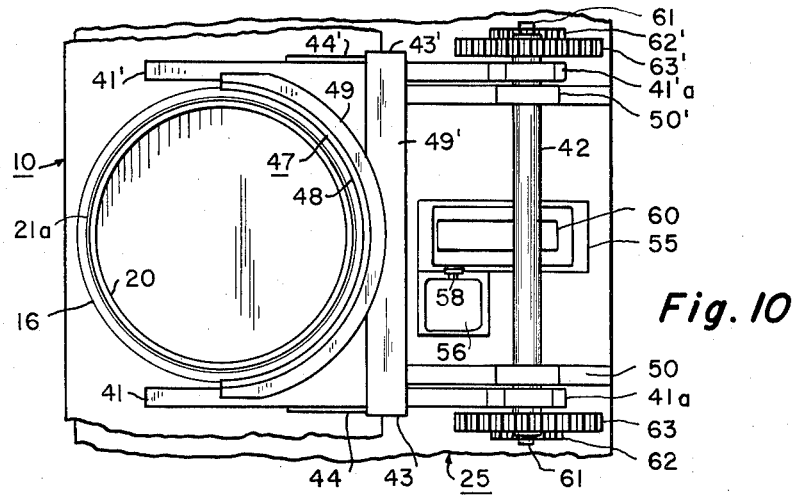
Figure 11:
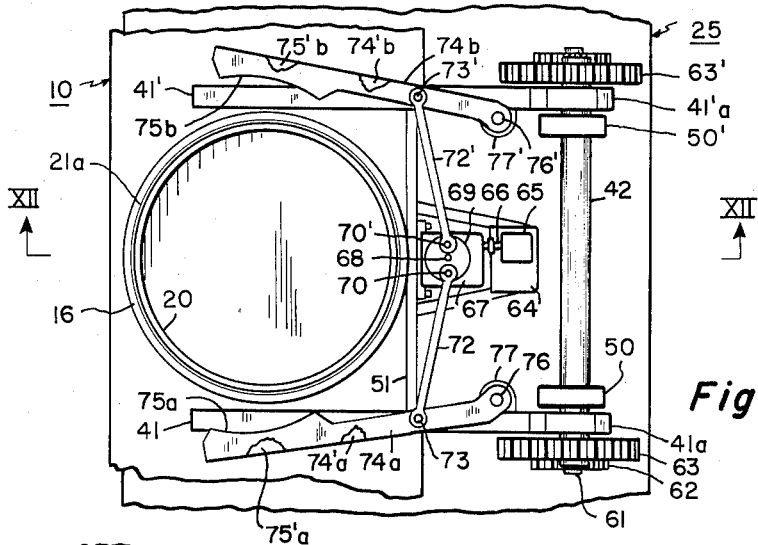
Figure 12:
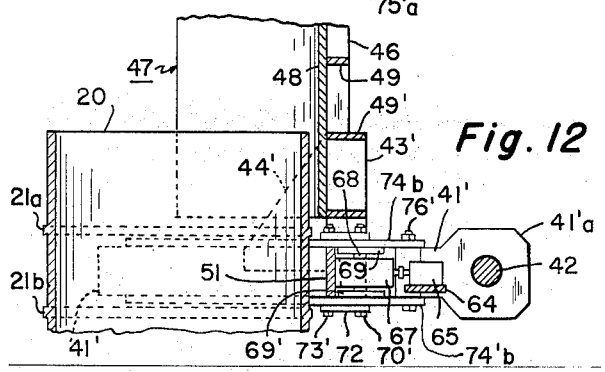

FIGURE 8 is an end view in elevation at the upper level position B on a further enlarged scale, showing the support buggy in place on the charging machine, as may be effected by lifting the buggy from the position A of FIGURE 1. Is also shows a charging chute and a gripping frame in a preliminary, off-side or forward position C which may be maintained when the buggy is being lifted or moved into and out of a cooperating relation or position with the charging machine;

FIGURE 9 is a view similar to and on the same scale as FIGURE 8, showing the chute in a back or cooperating "down" position D with respect to an aligned container. It also shows the chute in a forwardly-downwardly tilted position E for delivering scrap from a selected container into the open mouth of a backwardly tilted furnace;

FIGURES 10 and 11 are fragmental top plan views on the scales of FIGURES 8 and 9 and particularly illustrating the operation of the gripping frame of such figures when it has been moved or swung backwardly-downwardly into a cooperating position with an aligned container. FIGURE 10 particularly illustrates actuating mechanism for turning or rotating the frame, with gripping means for the container omitted. FIGURE 11 shows gripping means in a ready position for moving inwardly into gripping association with the container, and shows actuating means for the gripping means but with actuating mechanism for rotating the frame omitted;

FIGURE 12 is a fragmental horizontal section in elevation on the scale of and taken along the line XII—XII of FIGURE 11.

THE OPERATION

In the illustrated embodiment of my invention, I have shown the employment of a support means or buggy 10 which is adapted to position and carry a group of three can-like containers 20, 20' and 20" in a longitudinally-aligned, spaced-apart, upright relation thereon. The containers may be filled with solid metal material at a scrap yard or collecting area, as by means of crane-operated electric magnet, and moved along a track on a lower plant level to a charging area adjacent the furnace, as represented by "ready" position A. The support buggy 10 is provided with a pair of longitudinally spaced-apart and balanced crane-hook-receiving posts or trunnions that project upwardly therefrom. This enables the buggy with fully filled containers positioned in a supported upright position thereon to be transferred, lifted or moved from the lower plant level position A to an upper plant level position B in the charging area and moved into a cooperating position with a charging machine 25. The charging machine is adapted to move longitudinally along an upper trackway 27 into and out of substantial alignment with one or more furnaces 8.

For purpose of illustration, I have shown one charging machine 25 operatively-positioned for charging one furnace 8 by means of a group or plurality of cans or containers 20, 20' and 20" and selectively, as indicated in FIGURES 3, 4 and 5. The charging machine 25 has means for moving the support means or buggy 10 longitudinally to selectively present each container in a transversely-aligned relation with a charging, engaging or gripping swing frame 40 and a charging, material feeding and guide chute 47, as well as with an open mouth portion 8a of furnace vessel 8. This latter movement is shown effected through the agency of a trackway 31 and a driving means, such as a drag chain or a belt unit, that are carried by the charging machine 25. The charging machine 25 also carries the charging swing frame 40 and the charging chute 47 for lifting and rotating a filled container that is transversely-aligned with the furnace mouth 8a to discharge, feed, guide and flow its contents from its open upper end or mouth, see FIGURE 9. After all the containers have been selectively emptied, they may then be lowered, as by a ladle crane 5, to the plant lower level or floor (position A) for movement to the scrap yard or collecting area for refilling in readiness for repeating the operation.

It is apparent that the apparatus is flexible in its utilization, in that several groups of containers may be maintained in readiness on an associated buggy at the lower level for charging one or more furnaces, and that an empty group may be filled while another group is being utilized to charge a given furnace. Also, although for simplicity of illustration, I have shown one charging machine for one furnace, it will be apparent that the same charging machine may be used for charging a group of furnaces along a longitudinal line, or that several charging machines may be used on the same track with suitable spacing therebetween for charging individual furnaces along the line.

In accordance with my invention, individual scrap containers can be provided of sufficient capacity that a group, as carried by one buggy, may be sufficient for completing the charging of solid material into a selected furnace, and without interfering with a normal completion of the charging of the furnace, as with molten metal, by using the same ladle cradle. For example, if the furnace 8 requires a load of 90 tons of scrap, each scrap container, 20, 20' and 20", may have a capacity of thirty tons.

In accordance with the procedure illustrated in FIGURES 3 to 5, inclusive, the scrap buggy 10 may be lifted to the upper level positioning B and placed on the charging machine 25 at its extreme left-hand position at which the container 20 is in charging alignment with the furnace 8. After container 20 has delivered its scrap to the furnace, then the driving mechanism carried by the charging machine 25 will engage the wheeled scrap buggy to move it one position to the right, as indicated in FIGURE 4, and retain it in such a position until its container 20' is discharged. Finally, the buggy is moved an additional position to the right or to its extreme right-hand position on the charging machine 25 to align the last container 20" with the furnace. After the container 20" is discharged, the scrap buggy 10 may be lifted-off the charging machine 25 and returned to the lower plant position A.

It is also apparent that since the scrap buggy 10 is provided with wheels it may be moved from the scrap yard or collecting area into an immediate charging area of the plant on a floor track 14 (see FIGURE 2), and when the containers are emptied, may again be moved back to a suitable scrap-receiving position at the lower level.

THE APPARATUS

Referring particularly to FIGURES 1 and 2, I have shown a trunnion-mounted oxygen blow vessel 8 suitable for an LD process whose open mouth 8a will normally face vertically-upwardly in alignment with an overhead hood 9 during a metal melting and refining operation, in order that effluent gases may be carried off to a stack or to a suitable cooling and dust removing apparatus. During the charging operation, the vessel 8 may be tilted on its trunnions 8b, as indicated in FIGURE 9, so that its open mouth 8a will be in a backwardly-inclined position to receive a charge. In this connection, it will be noted that the hood 9 may remain in place without interfering with the charging operation. As shown in FIGURE 3, the trunnions are rotatably carried in bearing stands 7 and may be driven by a motor-actuated tilt drive 6.

The scrap buggy 10 is provided with flanged wheels 11 that are rotatably carried, as by means of side mounts 13 and transverse axle shafts 12 (see FIGURES 6 and 8) for movement along a longitudinal lower or floor level track 14 as well as along the upper level track 31 that is carried by the charging machine 25. The buggy 10 has a substantially flat or planar table 15 (see FIGURES 1, 2 and 9) that is provided with longitudinally spaced-apart, upwardly-projecting, circular retainer flanges or annuluses 16, 16' and 16" for liftably or removably-receiving the containers 20, 20' and 20" and retaining them in a non-sliding relationship on the table. Upwardly-projecting post, trunnion or lift arm pairs 17 and 17' are secured on the table 15 in an equally-spaced or balanced relation from its longitudinal ends and in the spacing between the flanges 16, 16' and 16". Cross-extending eyelet pins or studs 19 and 19' are mounted to extend across upper end portions of the lift arm pairs 17 and 17' to receive hooks of an overhead traveling crane, such as of a conventional overhead traveling ladle crane 5. The lower ends of the arm pairs 17 and 17' are reinforced in their secured positioning on the table 15 by mounting flanges 18 and 18'.

The crane 5, as shown in FIGURE 1, is employed to lift the buggy 10 and filled containers positioned in a balanced relation thereon from lower level position A to an upper level and move the buggy at the upper level to position B on rails 31 of the charging machine 25. When the containers are emptied, the crane 5 may then be employed to lift the buggy 10 of the charging machine 25, move it to a vertically-cleared position with respect to the upper plant level apparatus, and then lower it to position A on the floor track 14.

Each can or container 20, 20' and 20", is shown of the same construction and, as indicated at the upper level positioning B and from the standpoint of the container 20 in FIGURES 8 and 9, each is of cylindrical shape 21 and is defined by an integral enclosing bottom wall 22a that rests on the flat surface of the table 15 and by a vertically-extending cylindrical or circular upwardly-projecting side wall 22b that terminates in an open top end or mouth portion. The shape 21 is also provided with longitudinally or vertically-spaced-apart flanges or ribs 21a and 21b which not only reinforce it, but also provide positioning guide means for grip side arms and gripping means of gripping swing frame 40 of the charging machine 25 (see FIGURES 9 and 12).

The charging machine 25, as shown particularly in FIGURES 1, 6 and 8, carries flanged wheels 26 for riding on rails 27 of an upper trackway. As will be noted in FIGURE 1, the platform 22 is carried by a pillar frame structure 23 that is shown mounted to extend from the floor level of the plant. The platform 22 may extend longitudinally along a line of furnace vessels 8, so that the machine 25 may be moved, as desired, therealong on the track rails 27 into operating association with a selected furnace vessel that is to be charged. The charging machine 25 may be energized in its movement by any suitable means, such as by a self-propelled motor unit or by a drag chain or belt (not shown).

The charging machine 25 has a table or platform 28 from which a pair of transversely spaced-apart I-beam members 30 extend upwardly along its opposite longitudinal sides (see particularly FIGURES 1, 6 and 7) to carry track rails or members 31 along which flanged wheels 11 of the support buggy 10 are adapted to move. Front and back stops 31a and 31b at the ends of the track members 31 limit maximum right and left hand movement of the buggy 10, as shown particularly in FIGURES 1 and 6, to thus retain it on the machine 25.

In FIGURES 6 and 7, I have illustrated means for actuating or driving the support buggy 10 along the track rails 31 of the charging machine 25. An electric motor 32 is shown mounted on the platform 28 and connected through its drive shaft 32a with a speed reducing unit 33 which is also mounted on the same platform. Driven shaft 33a of the unit 33 extends through an opening in an adjacent beam member 30 and is shown connected to a drive shaft 33b of a drive pulley 34. The drive shaft 33b is journaled in mounts or stands 35 which extend from the table or platform 28. Guide and belt tensioning idler pulleys 36 and 36' have shafts that are operatively positioned at opposite ends of a continuous drive belt 39. The shaft of pulley 36' is journaled within a pair of stands 37 and the shaft of pulley 36 is journaled within an adjustable pair of stands 38; both pairs of stands are mounted on the platform 28. The stands 38 enable the continuous drive belt 39 to be adjusted as to its tensioning through the agency of the pulley 36. The belt 39 leaves over the drive pulley 34 and the idler pulleys 36 and 36' and need only be driven in one direction by the motor 32.

Dogs 39a project from the outer surface of the belt 39 at spaced intervals longitudinally therealong to engage an adjacent axle shaft 12 of the buggy 10 when the buggy is lowered into position on the track rails 31 of the charging machine 25. In this manner, the buggy is selectively moved from an extreme left-hand position, shown in FIGURES 3 and 6, through the positions represented by FIGURES 4 and 5, or in other words, from an abutting relationship with the left-hand stop 31b to an abutting relation with the right-hand stop 31a. With this arrangement, I have been able to employ a single direction of motor rotation, in that a dog 39a is always in an adjacent relation to, during its arcuate path of movement, engage and later disengage from an axle shaft 12 of a buggy 10 when it is positioned on the charging machine 25.

With particular reference to FIGURES 8 to 12, inclusive, the swing arm or gripping frame 40 is shown operatively carried by the charging machine 25 on its platform 28 and, in turn, carries charging or feed-guide chute 47. The frame 40 is provided with a spaced-apart pair of side arms 41 and 41' whose forward end portions 41a and 41'a are secured on a rotatable swing shaft 42. The shaft 42 is journaled within side stands 50 and 50' which projects upwardly from the table 28 and is actuated by a reversible electric motor 56 (see FIGURES 8, 9 and 10). The motor 56 is carried on a pad 57 of a centrally-positioned stand 55 that also projects upwardly from the platform 28. The motor 56 has a drive shaft 58 which is connected through a gear reduction unit 60 and its driven shaft 61 to end-positioned pinions 62. The unit 60 is directly mounted on the central stand 55. The pinions 62 and 62' are secured on the opposite end of the shaft 61 and engage with gears 63 and 63' that are secured on the ends of the swing shaft 42; the shaft 61 extends parallel to and below the swing shaft 42. It is thus apparent that the motor 56 may be employed to turn the shaft 42 in one direction to move the swing frame 40 forwardly between positions D and E of FIGURE 9 to discharge a filled container, and backwardly from position E to position D after the container, such as 20, has been emptied.

As illustrated particularly in FIGURES 10 and 12, curvilinear or semi-circular shell wall 48 of the guide chute 47 is carried on the swing frame 40 by means of a pair of longitudinally or vertically-upwardly projecting transverse members 43 and 43' and reinforcing cross-extending rib-like members 49 and 49'. The chute 47 also has a pair of spaced-apart longitudinally-extending members 46 that are secured or tied into the members 43 and 43' as well as the ribs 49 and 49', and that extend along the underside of the chute 47. Guide wings 44 and 44' are secured at their bottom portions to the members 43 and 43' and project upwardly to further reinforce the structure. The curvilinear shell wall 48 is open at its front and back ends, has an inclined edge at its charging or front end, is open at its top, and is constructed to define a space-bridging guide wall for material being flowed from a container 20 into the furnace mouth portion 8a, see position E of FIGURE 9. It will be noted that the back end portion of the chute 47 provides an overlapping complementary fit with the upper portion of an associated container 20, and that its front end portion is adapted to extend within the furnace 8 during a charging operation.

A base pad or platform member 64 is supported on a cross member 51 to carry a reversing electric motor 65 that drives a gear reduction unit 67. The unit 67 is also mounted on the cross member 51 that connects the arms 41 and 41' (see FIGURES 11 and 12). As shown particularly in FIGURE 11, motor shaft 66 is connected to a speed reducing gear unit 67 (see also FIGURE 12) whose vertical output or driven shaft 68, at its opposite ends, carries circular discs or wheels 69 and 69' in a secured position thereon. Each disc or wheel 69 and 69' has a pair of pivot pins 70 and 70' secured to project from its face for driving a cooperating pair of swing arms 72 and 72'. It will be noted from FIGURE 12 that there are upper and lower pairs of swing arms 72 and 72' which, at their inner ends, are pivotally-mounted on the pins 70 and 70' and, at their outer ends, are pivotally mounted on pins 73 and 73' that are carried by grip arms. An upper pair of grip arms is designated as 74a and 74b and a lower pair is designated as 74'a and 74'b; these arms have back portions whose inner edge faces are curved to correspond to the curvature of an associated scrap can, such as 20, and are designated as 75a, 75'a, 75b and 75'b.

From the standpoint of the opposite side of the container being gripped, grip arms 74a and 74'a constitute one side pair and arms 74b and 74'b constitute an opposite side pair; the first-mentioned pair cooperates with and operates along opposite (upper and lower) sides of the side arm 41 and the second-mentioned pair cooperates with and operates along opposite (upper and lower) sides of the side arm 41' to engage the container 20 between its spaced apart flanges 21a and 21b. The grip arms 74a and 74'a, on one side of the apparatus, are pivotally mounted at their ends on pins 76 that project upwardly from a mount 77 which are secured to the side arm 41. Similarly, the grip arms 74b and 74'b, on the other side of the apparatus, are, at their ends, pivotally mounted on pins 76' which are carried by a mount 77' on side arm 41'. As shown in FIGURES 11 and 12, the pair of grip arms on each side of the frame 40 are adapted to grip latch-engage each container as it is presented in transverse alignment with the open mouth portion 8a of the furnace 8 by the support buggy 10. Such engagement is between flanges or ribs 21a and 21b and an associated side arm 41 or 41'. Thus, there is no danger of the container slipping when it is rotated into and out of a charging position with respect to the open mouth 8a of the furnace 8.

When the chute 47 is in its forwardly-swung and declining position E of FIGURE 9, it serves to bridge the spacing between the filled container and the furnace and to guide the flow of solid material into the furnace vessel in such a manner as to protect the furnace lining and the cone of the vessel.

As shown particularly on FIGURES 8 and 9 of the drawings, the charging frame 40 and the chute 47 are adapted to be swung to a forward position C in which the side arms of the frame 40 are substantially vertical and the chute 47 is substantially horizontal to provide a so-called "clearing" position from the standpoint of the charging machine 25 when the support means or buggy 10 is being moved with filled containers thereon into a cooperating relation with the machine. Also, this so-called "clearing" position C may be assumed when the containers have been emptied and they are to be moved on their support means or buggy 10 from the upper level of the charging machine 25 to a lower plant level, such as indicated by A of FIGURE 1.

The backward position D of FIGURE 9 which is an operating position from the standpoint of the container, is attained by swinging the frame 40 and the chute 47 arcuately-backwardly 90° from position C. In position D, the side arms of the frame 40 are substantially horizontal and the chute 47 is substantially vertical and in a cooperating relation with a transversely-aligned container whose material content is to be charged into the furnace. When the frame 40 and the chute 47 are swung or pivoted forwardly from position D to position E, it will be noted that the particular filled container, such as 20, being engaged is lifted off the support means 10 and turned, rotated, or tilted from a substantially vertical or upright position in an arcuate path through a substantially perpendicular or horizontal position and beyond such position to a forward declining cooperating position with respect to the mouth 8a of the furnace 8. Thus, the container is tilted or rotated from the standpoint of its longitudinal axis which extends through its open end or mouth along an arcuate path of 90° plus.

When the upper end of a fully filled container 20 is initially tilted from its vertical plane, as it is being lifted off the support means 10 by the frame 40, a portion of the material will fall from its open end into the chute 47 and will progressively fall therefrom into the chute until the chute passes beyond a position in which its longitudinal axis is substantially horizontal, at which time, it will begin to, in effect, flow from the chute into the furnace. It is well known that material, such as scrap metal, consists of irregular shapes and that there is often a tendency for a portion of the mass of the material to temporarily lock in place and then fall as a large mass. By employing a guide chute which is always in alignment with the open mouth of the container during its turning movement, I provide a substantially uniform, smooth flow of the material from the forward end of the chute, substantially from the time the chute reaches a forwardly-inclined position within the furnace. In this connection, material which is received by the chute during the initial tilting of the container will act to slow down the movement of subsequent material leaving the container.

Another advantage of my apparatus, system or arrangement is that by providing a chute which is separate from the container, I can introduce it into the mouth of the furnace without interference with the nose thereof or with other adjacent apparatus, so that the chute may extend substantially within the furnace mouth and lessen the distance of fall of the material being fed with respect to the bottom of the furnace. By providing a substantially rolling-guided flow of the mass of material from the chute and by introducing the forward end portion of the chute into the furnace, I not only more efficiently feed or charge the material, but lessen wear and tear on the lining of the furnace. Mass dumping of the material is avoided, since the chute and material received therein act as holding means until the forward angle exceeds the angle of repose. The chute operates to, in effect, prevent a mass dumping type of action and to direct a flow substantially uniformly and smoothly into the furnace as well as to break the fall of material from the open mouth of the container.

Further, by providing a separate chute and utilizing a can-like container, I can provide a much larger charge and effectively make use of it from the standpoint of a given extent of lateral or transverse plant space that extends from the mouth of the furnace. It will be apparent that the use of a can-like container makes possible a full 100% cylindrical charge or a charge mass which makes maximum use of vertical or overhead spacing in the plant and minimizes lateral or transverse spacing and, as distinguished from an open scrap bucket, which can only contain about half the quantity of material from the standpoint of its vertical dimension and, for this reason, must be principally enlarged or lengthened laterally or transversely of the space and possibly somewhat enlarged longitudinally of the space to obtain a capacity of charge which is comparable with the capacity of charge of my can-like container. Also, if an open scrap box is tilted into a charging position with the mouth portion of a furnace, clearance limitations make it impractical or impossible to introduce the forward end of the scrap box into the open mouth of the furnace, as compared with the substantial introduction which is made possible by means of my construction. Further, as distinguished from an open scrap bucket, I can effectively charge molten material or metal as well as solid material, such as scrap.

As shown particularly in FIGURES 8 and 9 of the drawings, the chute 47 is swingable to a forwardly-offset, out of the way position C with respect to the platform 28 of the charging machine 25 when the support means or buggy 10 is being lifted with its filled containers 20, 20' and 20" at the charging area from a lower position, such a A of FIGURE 1, to an overhead position and then lowered upon the trackway rails 31 of the platform 28. It will be noted that the side-gripping arms are also swingable with the chute 47 to fully clear a vertical area above the table 28 (see FIGURE 8) and not interfere in any way with either a vertical lowering and placing of the support buggy or means 10 on the platform or a vertical raising and removing of it therefrom after its containers have been emptied. As shown particularly in FIGURE 9, when the chute 47 and the gripping side arm structure are moved or swung to their backward positions by the charging machine 25, the arms move into a position about the container 20 and the chute simultaneously moves into an abutting-aligned or fitting and material-guiding relation with respect to the open mouth of the container. It is thus apparent that the chute additionally supports the container during its tilting movement.

Although I have illustrated and described an embodiment of my invention, it will be apparent to those skilled in the art that various modifications and adaptations may be made without departing from its spirit and scope, as indicated by the appended claims.

What I claim is:

1. Apparatus for overhead charging solid material in the nature of scrap metal through an open mouth portion of a metal melting and refining furnace which comprises, a group of substantially cylindrical containers of suffiicent capacity for fully charging the furnace with the solid material; each of said containers having a closed side wall, an open-mouth upper end and longitudinally spaced-apart flange rings about its side wall; a support buggy for said group of containers, said buggy having axial shafts carrying wheels thereon for moving said buggy, said buggy having a substantially planar platform and projecting flanges thereon in a longitudinally spaced-apart relation for encircling and retaining said containers in an upright position thereon in such a manner that said containers may be lifted on and off said platform, a pair of crane-hook-receiving post means projecting upwardly in a balanced relation from said platform between said projecting flanges whereby said buggy with filled containers thereon may be lifted from a lower plant level to an upper plant level and said buggy with empty containers thereon may be returned to the lower plant level, an upper platform extending longitudinally along the furnace at the upper plant level, a longitudinal trackway on said platform, a charging machine operatively mounted for movement on said trackway, said charging machine having a platform thereon and a longitudinal trackway along said platform for receiving the wheels of said buggy when said buggy is raised to the upper plant level with filled containers thereon, said last-mentioned trackway having stop means at its opposite sides for limiting maximum movement of said buggy on said charging machine, said charging machine having a motor-driven belt operatively positioned to extend longitudinally-centrally thereof, pulley means for operatively positioning and adjusting the tension of said belt, dogs projecting outwardly from said belt in a spaced relation therealong for selective engagement wth one of the axial shafts of said buggy when said buggy is positioned on said last-mentioned trackway for moving said buggy longitudinally with respect to said charging machine to selectively align each of said containers, a container gripping frame swingably-mounted on said charging machine and having side arms extending transversely-backwardly of the furnace for positioning along opposite sides of one of said containers that is selectively aligned therewith, pairs of gripping fingers pivotally-carried by each of said side arms for engagement with said one container between its said flange rings, motor means for moving said gripping fingers into and out of gripping engagement with each container, and motor means for swinging said side arms and said one container being gripped by said pairs of gripping fingers between an upright position on said buggy and a forwardly-declining material-discharging cooperating position with the open mouth portion of the furnace.

2. Apparatus as defined in claim 1 wherein, a chute is carried on said frame and has a back open-end portion to fit about an upper portion of the side wall of said one container when said side arms are positioned along opposite sides thereof, said chute has a forward open-end portion to guide and discharge the material from the open-mouth upper end of said one container into the open mouth portion of the furnace when said container has been moved to its forwardly-declining material-discharging cooperating position with the open mouth portion of the furnace, and said chute is constructed to extend in a forwardly-declining relation within the furnace when said one container is in its forwardly-declining position with the open mouth portion of the furnace.

3. Apparatus as defined in claim 1 wherein, back end portions of said side arms are secured on a swing shaft rotatably carried by said charging machine, a reversing motor and a speed reducing means are positioned on said charging machine and are operatively-connected to rotate said swing shaft, a second motor is positioned on said charging machine and is operatively-connected through rotating discs and pivotally-mounted operating arms to said gripping finger pairs for moving them into and out of gripping engagement with said one container, each pair of gripping fingers is pivotally-carried on an associated one of said side arms for movement along opposite sides of said associated arm and between said flange rings of said one container into and out of gripping engagement with said one container in such a manner as to prevent sliding movement of said one container with respect to said side arms when said one container is being swung by said side arms.

4. Apparatus for overhead charging material of the nature of metal scrap through an open mouth portion of a melting and refining furnace that is located at a charging station which comprises, at least one open-mouth container for receiving the material, movable support means for removably-positioning the container in a substantially upright position thereon, so that the container when filled with the material may be moved on said support means to the charging station and when emptied may be moved therefrom from the charging station, a swingably-mounted charging frame at the charging station constructed for movement into and out of gripping engagement with the container while the container is in its substantially upright position on said support means, and operating means cooperating with said frame for moving the filled container engaged thereby upwardly-off and out of its positioning on said support means and tilting it through an arcuate path into a forwardly-offset and inclined position in which its open mouth is in alignment with the open mouth portion of the furnace to charge the material into the furnace and for then tilting the emptied container through a return arcuate path back to its substantially upright position on said support means.

5. Apparatus as defined in claim 4 wherein a pair of opposed side arms are carried by and project from said frame along opposite sides of the container when said frame is in gripping engagement with the container, and opposed pairs of swing arms are pivotally carried by said opposed pair of side arms for movement into and out of gripping engagement with opposite sides of the container.

6. Apparatus defined in claim 4 wherein, the container has a pair of outwardly-projecting annular flanges thereabout in a spaced relation therealong, a pair of opposed side arms are carried by and project from said frame for movement into position along opposite sides of the container between the said spaced pair of flanges when said frame is moved into gripping engagement with the container, and a pair of swing arms are pivotally-carried by each of said side arms for movement along opposite edges thereof into gripping engagement with opposite sides of the container between said flanges and the associated side arm.

7. Apparatus as defined in claim 4, wherein, a chute is mounted for movement with said frame and with respect to said support means into and out of cooperative fitting alignment with the container, and said chute is constructed when it is in cooperative abutting alignment and the container is in its forwardly-tilted position to fully bridge spacing between the container and the open mouth of the furnace for guiding the material from the container into the furnace.

8. Apparatus as defined in claim 7 wherein, said operating means is constructed to lift the filled container from its position on said support means and tilt it forwardly from its substantially upright position through an arcuate path of over 90° into its forwardly-inclined position, and means secures said chute to said frame in such a manner that said chute is in an overlapping material-receiving fitting alignment with an end portion of the filled container adjacent its open mouth when said frame is in gripping engagement with the container and during the tilting movement thereof by said operating means, whereby the container is additionally supported by said chute during the tilting movement.

9. Apparatus for overhead charging material of the nature of metal scrap into an open-mouth portion of a melting and refining furnace that is located within a furnace charging area which comprises, a group of open-mouth containers for receiving and carrying the material therein, a support means for removably-positioning said containers in substantially upright vertically-supported and longitudinally spaced-apart positions thereon, means for moving said support means with filled containers in their substantially upright positions threon between a material-receiving area and the furnace charging area, a platform at an upper plant level within the furnace charging area and adjacent the open mouth portion of the furnace, a charging machine operatively-positioned on the platform in cooperative alignment with the furnace, horizontally-extending means at the upper plant level of the furnace charging area for receiving and positioning said support means thereon for movement therealong adjacent said charging machine, said support means having means associated therewith in its positioning on said horizontally-extending means for selectively moving each of filled containers thereon into and out of transverse alignment with said charging machine, container-engaging means swingably-carried by said charging machine for engaging each filled container when the container is in transverse alignment therewith, and operating means carried by said charging machine for swinging said engaging means and the filled container engaged thereby upwardly-off and out of its positioning on said support means into a forwardly-declining material-discharging position with respect to the open-mouth portion of the furnace and for then swinging the emptied container upwardly-backwardly to its original position on said support means, and for thereafter engaging each successive transversely-aligned container of the group and swinging it into and out of the forwardly-declining material-discharging position with respect to the open-mouth portion of the furnace.

10. Apparatus as defined in claim 9 wherein said horizontally-extending means is a secondary platform carried by said charging machine.

11. Apparatus as defined in claim 10 wherein said means associated with said support means in its positioning on said secondary platform is a forwardly-moving continuous means operatively-carried by said secondary platform and having means constructed to move it forwardly through an arcuate path into and out of engagement with said support means.

12. Apparatus for overhead charging material of the nature of scrap metal into an open mouth portion of a metal refining furnace which comprises, at least one open-mouth can-like container for the material, a movable support means for removably-supporting said container in an upright position thereon while it is being filled with the material and while it is being moved to a furnace charging area, a charging machine operatively-positioned within the charging area at an upper plant level adjacent the open mouth of the furnace, said support means having means for moving the filled container from a lower plant level to the upper plant level into a cooperating relation with said charging machine, said charging machine having means for moving the filled container on said support means at the upper plant level into and out of a transversely-aligned position with respect to said charging machine and additional means for also moving the filled container into and out of a transversely-aligned position with respect to the open mouth portion of the furnace, and side-gripping means carried by said charging machine for engaging said container when it is in its transversely-aligned position with said charging machine and the open mouth of the furnace for lifting it fully off said support means and swinging it forwardly and downwardly towards the open mouth of the furnace for charging the furnace.

13. Apparatus as defined in claim 12 wherein, a platform is positioned at the upper plant level adjacent said charging machine for removably-receiving said support means thereon, a chute is carried by said charging machine for movement into and out of a cooperating material-receiving fitting relation with the open mouth of a filled container when said support means is received by said table, said side-gripping means is secured for swing movement by said charging machine between a forward position and a backward position about said container, and said chute is secured for swinging movement with said side-gripping means to a forward position to clear a vertical area above said table when said support means moves the filled container from a lower plant level to the upper plant level on said table and then for swinging movement into its fitting relation with the open mouth of the container when said side-gripping means is swung to its backward position about said container.

14. Apparatus for overhead charging material of the nature of metal scrap into an open mouth portion of a melting and refining furnace at a furnace charging area which comprises, a group of open-mouth containers for receiving and carrying the material therein, a support buggy for removably-positioning said containers in substantially upright vertically-supported and longitudinally spaced-apart positions thereon, said support buggy having means for moving said containers from a lower material receiving area to an upper plant level at the furnace charging area after they had been filled with the material and for returning them from the furnace charging area after they have been emptied of the material, a primary platform at an upper plant level within the furnace charging area adjacent the open mouth portion of the furnace, a charging machine operatively-positioned for movement along said primary platform into and out of charging alignment with the furnace, said charging machine having a secondary platform thereon for receiving said support buggy when it is moved upwardly to the upper plant level at the furnace charging area, means associated with said support buggy for progressively moving it along said secondary platform to selectively transversely-align each filled container of said group with said charging machine and to selectively move each emptied container out of transverse alignment with said charging machine, and a swing frame carried by said charging machine and having means constructed to engage each selectively-aligned filled container and to lift it off and out of position on said support buggy through an overhead arc into a forwardly-offset and downwardly-declining material-discharging position with respect to the open mouth portion of the furnace and for thereafter swinging the emptied container back through the overhead arc to its original position on said support buggy.

15. Apparatus as defined in claim 14 wherein, said support buggy is provided with flanged wheels, said secondary platform has a trackway thereon for receiving the flanged wheels of said support buggy for movement therealong, and said charging machine has operating means to engage said buggy and move it along the trackway of said secondary platform.

16. Apparatus as defined in claim 15 wherein said means associated with said support buggy for progressively moving it along said secondary platform comprises, a continuous belt operatively-carried by said charging machine beneath said secondary platform, motor means for driving said belt, and a series of longitudinally spaced-apart dogs projecting from said belt for engagement with said buggy when said buggy is received by said secondary platform to selectively transversely-align each of the filled containers with said charging machine and to selectively move each empty container out of transverse alignment therewith.

References Cited by the Examiner

UNITED STATES PATENTS

| | | | |
|---|---|---|---|
| 1,861,634 | 6/32 | Lathrop | 214—314 |
| 2,626,071 | 1/53 | Smith | 214—314 |
| 2,836,309 | 5/58 | McFeaters | 214—18 |
| 2,948,428 | 8/60 | Kughler | 214—653 |

HUGO O. SCHULZ, *Primary Examiner.*